United States Patent [19]

Gordon et al.

[11] 3,919,337

[45] Nov. 11, 1975

[54] PREPARATION OF 1,1,2-TRICHLOROETHANE

[75] Inventors: Scott C. Gordon, Rockaway, N.J.; Ares N. Theodore, Farmington, Mich.

[73] Assignee: Diamond Shamrock Corporation, Cleveland, Ohio

[22] Filed: May 1, 1973

[21] Appl. No.: 356,112

[52] U.S. Cl. ............................................. 260/658 R
[51] Int. Cl.² ......................................... C07C 17/10
[58] Field of Search ................................ 260/658 R

[56] References Cited
UNITED STATES PATENTS 2,174,737   10/1939   Coleman et al. ............. 260/658 R
3,173,963   3/1965   Reiche et al. ................ 260/658 R
3,344,197   9/1967   Reiche et al. ................ 260/658 R

FOREIGN PATENTS OR APPLICATIONS 511,440   3/1955   Canada ......................... 260/658 R
732,249   4/1966   Canada ......................... 260/660

*Primary Examiner*—Delbert E. Gantz
*Assistant Examiner*—Joseph A. Boska
*Attorney, Agent, or Firm*—William A. Skinner

[57] ABSTRACT

Process for the preparation of 1,1,2-trichloroethane by thermal chlorination of 1,2-dichloroethane in a liquid reaction medium of 1,1,2-trichloroethane and 1,2-dichloroethane maintained at elevated temperature and pressure conditions.

6 Claims, No Drawings

PREPARATION OF 1,1,2-TRICHLOROETHANE

FIELD OF THE INVENTION

The present invention is directed to the preparation of 1,1,2-trichloroethane (TCA). More particularly, the invention is concerned with the conversion of 1,2-dichloroethane (EDC) to 1,1,2-trichloroethane. In its more specific aspects the invention concerns a process for the efficient production of 1,1,2-trichloroethane by introducing 1,2-dichloroethane and chlorine into a liquid reaction medium of 1,2-dichloroethane and 1,1,2-trichloroethane under appropriate conditions of temperature and pressure, without the use of catalysts or additional reactants.

DESCRIPTION OF THE PRIOR ART

A number of processes for the preparation of 1,1,2-trichloroethane from 1,2-dichloroethane and chlorine are known in the prior art. For example, the reaction of 1,2-dichloroethane and chlorine in a liquid bath under actinic light irradiation has been disclosed in U.S. Pat. No. 2,174,737. Also known is a process of feeding ethylene and chlorine into a liquid reaction medium of 1,2-dichloroethane and 1,1,2-trichloroethane in the presence of a metal chloride catalyst to produce 1,1,2-trichloroethane, as disclosed in U.S. Pat. No. 3,173,963. Still another procedure has been described in U.S. Pat. No. 3,344,197 wherein 1,2-dichloroethane and chlorine are introduced into liquid 1,2-dichloroethane and 1,1,2-trichloroethane simultaneously with ethylene.

These prior art procedures have a number of limitations. One requires the use of an extrinsic light source as catalyst. Another relies upon the addition of a metal chloride catalyst, with attendant handling and cost problems. A third process is dependent upon the addition of ethylene to enable the reaction to proceed at an acceptable rate. All of the prior art procedures recommend the complete elimination of oxygen from the reaction medium. Without further purification, oxygen is typically present in all commercially manufactured chlorine.

SUMMARY OF THE INVENTION

The method of the present invention does not suffer from the limitations of the prior art. It has been discovered that 1,1,2-trichloroethane may be efficiently produced by the direct chlorination of 1,2-dichloroethane without the use of catalysts or additional reactants. The present invention may be briefly described and summarized as a process for the production of 1,1,2-trichloroethane which comprises introducing chlorine and 1,2-dichloroethane into a liquid reaction medium of 1,1,2-trichloroethane and 1,2-dichloroethane while maintaining said reaction medium at a temperature of at least 265° and at a pressure of at least 50 pounds per square inch gauge. The use of a catalyst is not required and the reaction proceeds efficiently without the addition of ethylene. Chlorine conversion rates are consistently above 90 percent, with corresponding yields of 1,1,2-trichloroethane above 80 percent. The presence of minor amounts of oxygen in the system is also acceptable.

One of the objects of present invention is therefor to provide a process for the production of 1,1,2-trichloroethane directly from 1,2-dichloroethane and chlorine using elevated temperature and pressure conditions.

A further object of this invention is to provide a process for rapid, economical production of 1,1,2-trichloroethane by thermochlorination of 1,2-dichloroethane using efficient reactor through-put rates.

A still further object is to provide a process for producing 1,1,2-trichloroethane directly from the reaction of chlorine and 1,2-dichloroethane without the use of catalysts or additional reactants.

Further objects will be apparent from the following description of the invention.

DESCRIPTION OF THE PREFERRED EMBODIMENTS

The process of the invention typically involves the introduction of elemental chlorine and 1,2-dichloroethane towards the bottom of a liquid reaction medium composed of 1,1,2-trichloroethane and 1,2-dichloroethane. The reactants are introduced in a ratio which may vary over a broad range, with mole ratios of 1:3.2 to 1:5.5 chlorine to 1,2-dichloroethane generally having been found acceptable. Preheating of the reactant feeds to about 120°F. for chlorine and about 180°F. for 1,2-dichloroethane assists in maintaining reaction stability, but is not essential.

In the reaction medium itself the formation of 1,1,2-trichloroethane will proceed using almost any concentration of 1,1,2-trichloroethane in 1,2-dichloroethane, with a typical range for most efficient yield being 10–40 weight percent 1,1,2-trichloroethane. At higher concentrations of 1,1,2-trichloroethane more overchlorinated materials such as tetrachloroethane and pentachloroethane are formed, while lower concentrations reduce the efficiency of the reaction and necessitate the use of larger equipment. The desired reaction medium is initially established by simply mixing appropriate proportions of the two components in the reactor, or by charging the reactor with 1,2-dichloroethane alone. The reaction medium usually has a vertical dimension of at least 6 feet (although liquid bed depth is not critical) and often may exceed 20 feet, typically provided by the use of a vertically disposed cylindrical reactor of convenient height and diameter.

The reaction may be conducted within a broad range of temperature and pressure conditions. The parameters of temperature and pressure are mutually interacting and dependent in that for any given temperature there will be an optimum pressure for maximum production of 1,1,2-trichloroethane. Operating at pressures either above or below the optimum results in less efficient production of 1,1,2-trichloroethane. The converse is also true, in that for any given pressure there is an optimum temperature for best operation of the process. The conversion reaction to 1,1,2-trichloroethane has been found to proceed economically using temperature conditions within the range of about 260° to about 300° F, and pressures from about 50 to about 90 pounds per square inch gauge. While the reaction would normally be favored by the use of lower temperatures, it has been found that the variable of pressure greatly affects the nature of the reaction, most likely by influencing the amount of chlorine dissolved in the liquid bed. It is believed that at lower pressures a greater portion of the reaction probably occurs in the gas phase since very little chlorine is dissolved in the liquid bed. Under such conditions, it is necessary for the 1,2-dichloroethane to diffuse into the gas phase or vice versa before any reaction occurs. As the pressure is increased, the amount of chlorine dissolved in the liquid bed increases until the reaction medium probably more closely approaches a homogeneous liquid phase. Under such conditions the dissolved chlorine is free to react with the liquid 1,2-dichloroethane and the reaction is more kinetically limited rather than mass transfer or diffusion limited. In any case, the interrelationship of temperature and pressure will determine an optimum combination for production of 1,1,2-trichloroethane.

When the reaction is carried out using temperatures and pressures within the normal operating range, gaseous co-product hydrogen chloride and minor amounts of organics such as 1,2-dichloroethane will escape from the liquid bed. These vapors are removed from the reactor and cooled to condense the organic content. The condensed organics may be recycled to the reactor, while the hydrogen chloride is removed from the system.

The product 1,1,2-trichloroethane is recovered by continuously withdrawing a portion of the reaction medium from the reactor, preferably from near the top of the liquid body. The 1,1,2-trichloroethane portion of the withdrawn liquid is then separated by a suitable method, such as fractional distillation. The remaining components of the withdrawn stream, primarily 1,2-dichloroethane, are then recycled to the reactant feed system. The rate at which the reaction medium is withdrawn is selected so as to maintain the rate of removal of 1,1,2-trichloroethane from the system substantially equivalent to the rate of formation of 1,1,2-trichloroethane in the liquid reaction medium. The initial ratio of 1,2-dichloroethane to 1,1,2-trichloroethane in the reactor is thus maintained substantially constant and buildup of 1,1,2-trichloroethane in the system is avoided.

The product 1,1,2-trichloroethane produced in the reaction medium by the described thermal chlorination process is quite pure, and the formation of undesirable polychlorinated ethanes is avoided while the use of catalysts or additional reactants is eliminated.

The following examples illustrate the process of the invention.

EXAMPLE I

A nickel tubular-shaped reactor 12 inches in diameter and approximately 20 feet in height was charged with 1,1,2-trichloroethane and 1,2-dichloroethane in proportions such that the initial content of 1,1,2-trichloroethane was about 30 percent by weight of the two components. A liquid body some 18 feet high was established. The temperature of the liquid body was then raised to about 265° F. by passing steam through copper tubing coiled around the reactor body.

At this point the feed of chlorine and 1,2-dichloroethane (preheated to 110° and 175° F. respectively) was begun. The reactor temperature was allowed to rise to an average of 275° F. and was maintained by adjusting the amount of steam and/or cooling water flowing through the external coils. The reactor pressure was maintained at 76 pounds per square inch gauge throughout the run. The reactor feeds were adjusted to provide approximately 47 pounds per hour of elemental chlorine and approximately 215 pounds per hour of 1,2-dichloroethane.

Under these conditions approximately 231 pounds per hour of crude product were removed from near the top of the liquid body. The composition of this product was determined to be:

| | |
|---|---|
| 1,1,2-trichloroethane | 31.10% (weight) |
| 1,2-dichloroethane | 66.09 |
| Tetrachloroethane (unsymmetrical) | 1.18 |
| Tetrachloroethane (symmetrical) | 1.46 |
| Pentachloroethane | 0.16 |

The product stream was forwarded to a purification system where 1,1,2-trichloroethane was separated from 1,2-dichloroethane by fractional distillation. The recovered 1,2-dichloroethane was recycled to the reactor by adding it to the feed. The 1,1,2-trichloroethane was recovered as a substantially pure product. In the instant example the yield of 1,1,2-trichloroethane was 90.3 percent (calculated on total moles of chlorine reacted and moles of 1,1,2-trichloroethane formed), and the chlorine conversion was 91 percent (based on total moles of chlorine reacted and moles of chlorine fed) during the 11.5 hours of continuous operation. Overall accountability of all reactants was 102 percent by weight.

While the foregoing describes a specific manner in which 1,1,2-trichloroethane may be efficiently produced directly from the reaction of chlorine and 1,2-dichloroethane without the use of catalysts, considerable latitude in operating conditions is possible. The following examples illustrate a wide range of operating parameters representative of those found operable in the process. Examples 2–7 were carried out using a 3 inch diameter by 7.5 foot high nickel reactor. Examples 8–13 were carried out using a 1 foot by 20 foot nickel reactor. The initial concentration of 1,1,2-trichloroethane in the reactor varied from 15–36 percent by weight.

| Example | Liquid Bed Depth | Temp. °F. | Pressure p.s.i.g. | Chlorine Feed per/hr. | EDC Feed per/hr. | Crude Product per/hr. | % TCA Yield | % Cl₂ Conversion |
|---|---|---|---|---|---|---|---|---|
| 2 | 6 ft. | 273 | 50 | 166 g. | 1340 g. | 1408 g. | 88.0 | 90 |
| 3 | 6 | 295 | 70 | 170 | 1339 | 1374 | 82.4 | 99 |
| 4 | 6 | 276 | 85 | 301 | 1359 | 1434 | 88.3 | 100 |
| 5 | 6 | 269 | 85 | 300 | 1318 | 1468 | 91.2 | 92 |
| 6 | 6 | 275 | 70 | 170 | 1210 | 1300 | 95.0 | 99 |
| 7 | 6 | 259 | 90 | 174 | 1223 | 1374 | 65.2 | 88 |
| 8 | 6 | 275 | 80 | 11.8 lb. | 47 lb. | 53 lb. | 78.5 | 96 |
| 9 | 6 | 275 | 80 | 20.4 | 94 | 104 | 85. | 90 |
| 10 | 12 | 275 | 79 | 21.6 | 94 | 109 | 86.1 | 95 |
| 11 | 12 | 275 | 78 | 47.2 | 190 | 210 | 88.9 | 92 |
| 12 | 18 | 275 | 75 | 48.7 | 200 | 221 | 85.0 | 93 |
| 13 | 18 | 275 | 75 | 55.6 | 248 | 278 | 89.9 | 100 |

As may be seen from the above, the reaction proceeds efficiently over a broad range of temperature and pressure combinations, namely above 265° F. and above 50 pounds per square inch gauge. At temperatures below 265° F., an apparent activation energy requirement was found to exist in the uncatalyzed reaction. Below 265° F. reactor temperatures become very erratic and difficult to control, regardless of pressure conditions, while above 265° F. the reactor operated smoothly and was easily controlled.

It is desirable to minimize the presence of iron salts in the reaction medium, since the presence of iron in concentrations ranging from 8 to 25 parts per million was found to somewhat reduce the efficiency of the chlorine conversion reaction. Additionally, should elemental oxygen be present in the reaction medium at the same time that iron concentrations exceed 8 parts per million, the reaction may be severely inhibited. However, if the iron content of the reaction medium is maintained below 8 parts per million, neither the presence of iron nor the presence of oxygen in concentrations as high as 2.6 mole percent in the feed chlorine were found to be detrimental.

However, contamination by iron salts should be avoided and toward this end it may be beneficial although not essential to introduce sufficient ethylene near the top of the liquid reaction medium to scavenge traces of unreacted chlorine from both the co-product gases and liquid product streams. This facilitates the fabrication of reactor auxiliaries from materials other than nickel. Should elemental chlorine be present in the co-product gases or liquid product stream, contact with iron containing equipment may generate undesirable iron chloride in the material which is recycled to the reactor. When the process is carried out using the preferred reaction conditions, such addition of ethylene should not normally be necessary.

We claim:

1. A process for the uncatalyzed production of 1,1,2-trichloroethane which comprises introducing chlorine and 1,2-dichloroethane into a liquid reaction medium of 1,1,2-trichloroethane and 1,2-dichloroethane while maintaining said reaction medium at a temperature of at least 265°F. and at a pressure of at least 50 pounds per square inch gauge, reacting the chlorine and 1,2-dichloroethane, and recovering the 1,1,2-trichloroethane product.

2. The process of claim 1 wherein the reaction medium is maintained at a temperature between 265° and about 300° F. and at a pressure of from 50 to 90 pounds per square inch gauge.

3. The process of claim 1 wherein the reaction medium is maintained at a temperature of about 275° F.

4. The process of claim 1 wherein the reaction medium is maintained at a pressure of about 80 pounds per square inch gauge.

5. The process of claim 1 wherein the concentration of 1,1,2-trichloroethane in the liquid reaction medium ranges from about 10 to about 40 percent by weight.

6. The process of claim 1 wherein the mole ratio of chlorine to 1,2-dichloroethane introduced into the reaction medium ranges from about 1:3 to about 1:6.

* * * * *